(12) United States Patent
Wiemker et al.

(10) Patent No.: US 12,646,170 B2
(45) Date of Patent: Jun. 2, 2026

(54) PULMONARY TRACTOGRAPHY APPARATUSES AND METHODS

(71) Applicant: KONINKLIJKE PHILIPS N.V., Eindhoven (NL)

(72) Inventors: Rafael Wiemker, Hamburg (DE); Roberto Buizza, Eindhoven (NL); Heike Carolus, Hamburg (DE); Jaap Roger Haartsen, Eindhoven (NL); Cornelis Petrus Hendriks, Eindhoven (NL); Thomas Koehler, Hamburg (DE); Olivier Pierre Nempont, Suresnes (FR); Michael Polkey, London (GB); Joerg Sabczynski, Hamburg (DE); Alexander Schmidt-Richberg, Hamburg (DE); Nataly Wieberneit, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 262 days.

(21) Appl. No.: 18/625,266

(22) Filed: Apr. 3, 2024

(65) Prior Publication Data

US 2025/0014175 A1     Jan. 9, 2025

Related U.S. Application Data

(60) Provisional application No. 63/525,180, filed on Jul. 6, 2023.

(51) Int. Cl.
| | |
|---|---|
| *G06K 9/00* | (2022.01) |
| *G06T 7/00* | (2017.01) |
| *G06V 10/764* | (2022.01) |

(52) U.S. Cl.
CPC .......... *G06T 7/0012* (2013.01); *G06V 10/764* (2022.01); *G06T 2207/10081* (2013.01);
(Continued)

(58) Field of Classification Search
CPC ......... G06T 7/0012; G06T 2207/10081; G06T 2207/10088; G06T 2207/30061;
(Continued)

(56) References Cited

U.S. PATENT DOCUMENTS

| | | | | |
|---|---|---|---|---|
| 6,642,716 B1 * | 11/2003 | Hoogenraad | .... | G01R 33/56341 |
| | | | | 324/309 |
| 6,690,816 B2 * | 2/2004 | Aylward | ................... | G06T 7/64 |
| | | | | 600/407 |

(Continued)

FOREIGN PATENT DOCUMENTS

| | | | | | |
|---|---|---|---|---|---|
| CN | 101952856 A | * | 1/2011 | ............. | G06T 7/149 |
| CN | 102549623 A | * | 7/2012 | ............. | G06T 11/10 |

(Continued)

OTHER PUBLICATIONS

Segmentation of PulmonaryVascularTrees fromThoracic 3D CT Images, Hidenori Shikata et al., Hindawi, 2009, pp. 1-11 (Year: 2009).*

(Continued)

*Primary Examiner* — Jayesh A Patel
(74) *Attorney, Agent, or Firm* — Daniel H. Brean

(57) ABSTRACT

A medical image processing device includes a display device; and an electronic processor programmed to perform a medical image processing method including receiving a three dimensional (3D) medical image; computing least one 3D derivative image of the 3D medical image; identifying a set of fibers in the 3D medical image by tracing fibrous image features in the at least one 3D derivative image starting from respective seed locations in the least one 3D derivative image; and controlling the display device to display an anatomical representation comprising or derived from the set of fibers.

16 Claims, 2 Drawing Sheets

(52) U.S. Cl.
CPC .............. *G06T 2207/10088* (2013.01); *G06T 2207/30061* (2013.01); *G06T 2207/30101* (2013.01)

(58) Field of Classification Search
CPC . G06T 2207/30101; G06T 2207/10072; G06T 7/194; G06T 7/12; G06V 10/764
See application file for complete search history.

(56) References Cited

U.S. PATENT DOCUMENTS

| | | | | |
|---|---|---|---|---|
| 2003/0214290 A1* | 11/2003 | van Muiswinkel | ....... | G06T 5/50 324/318 |
| 2005/0036691 A1* | 2/2005 | Cathier | ................ | G06V 10/507 382/286 |
| 2020/0320684 A1* | 10/2020 | Wiemker | .................. | G06T 7/12 |
| 2021/0201495 A1* | 7/2021 | Yu | .......................... | A61B 5/091 |

FOREIGN PATENT DOCUMENTS

| | | | | |
|---|---|---|---|---|
| DE | 112004001691 T5 * | 7/2006 | ............. | G06T 19/00 |
| WO | WO-2005031649 A1 * | 4/2005 | ............... | G06T 7/70 |

OTHER PUBLICATIONS

Automated segmentation of Pulmonary Vascular Tree From 3D CT Images, Hidenori Shikata et al., SPIE, 2004, pp. 107-116 (Year: 2004).*

Automated detection of lung nodules in CT images using shape-based genetic algorithm, Jamshid Dehmeshki et al., Elsevier, 2007, pp. 408-417 (Year: 2007).*

International Search Report for PCT/EP2024/067926 filed Jun. 26, 2024.

Shikata H. et al., "Automated segmentation of pulmonary vascular tree from 3D CT images", Proceedings of SPIE, IEEE, U.S. vol. 5369, No. 1 (Jan. 1, 2004) pp. 107-116.

Haussecker, H. et al., "A tensor approach for precise computation of dense displacement vector fields." In: Mustererkennung 1997: 19. DAGM-Symposium Braunschweig Sep. 15-17, 1997 Springer Berlin Heidelberg, 1997 S. 199-208.

Tipre, D.N. et al., "Imaging Pulmonary Blood Vessels and Ventilation-Perfusion Mismatch in COVID-19". Molecular Imaging and Biology (2022) 24:526-536. https://www.ncbi.nlm.nih.gov/pmc/articles/PMC8764889/.

Mori, S. et al., "Fiber tracking: principles and strategies—a technical review." NMR In Biomedicine 15, 2002. https://citeseerx.ist.psu.edu/document?repid=rep1&type=pdf&doi=4927e2907526c99e70a5cb13caa304d344d5286d.

Nardelli, P. et al., "Pulmonary artery-vein classification in CT images using deep learning". IEEE Trans Med Imaging 2018; 37: 2428-2440.

Rahaghi, F.N. et al., "Pulmonary vascular density: comparison of findings on computed tomography imaging with histology." European Respiratory Journal (2019). https://erj.ersjournals.com/content/54/2/1900370.figures-only#ref-27.

Ahookhosh, K. et al., "Development of human respiratory airway models: A review." Development of human respiratory airway models: A review, European Journal of Pharmaceutical Sciences 145, 2020.

* cited by examiner

PULMONARY TRACTOGRAPHY APPARATUSES AND METHODS

CROSS-REFERENCE TO RELATED APPLICATIONS

This patent application claims the priority benefit under 35 U.S.C. § 119 (c) of U.S. Provisional Application No. 63/525,180, filed on Jul. 6, 2023, the contents of which are herein incorporated by reference.

The following relates generally to the medical imaging arts, pulmonary imaging arts, medical image processing arts, pulmonary image processing arts, medical imaging driven medical diagnostic and treatment guidance arts, medical imaging driven pulmonary diagnostic and mechanical ventilation therapy arts, and related arts.

BACKGROUND

A quantitative and spatially resolved assessment of the lung's ventilation and perfusion is desired to optimize the ventilator settings and other therapy parameters in mechanically ventilated patients. Usually, the aim is to match ventilation and perfusion (aka. V–Q matching) as ventilation and perfusion are equally important for proper gas exchange in the alveoli.

Ventilation and Perfusion (V+Q) modeling of the lung requires in particular the anatomical structures of airways, veins, arteries. While the inference of these structures from 3D-image volumes (e.g., by convolutional neural networks (CNNs)) is known to be technically feasible, the model building (i.e., explicit analytical modeling or implicit Machine Learning) and the necessary annotation of training data is tedious and expensive, due to the delicate, intertwined nature of these tree structures, which manifest weak and incomplete on clinical image volumes, and close to or below the resolution limit.

Local appraisal on a voxel-by-level basis is not only time-consuming but often unfeasible; even for an expert annotator it is often ambiguous whether a certain voxel group is part of an airway or rather an image artefact, because an airway is filled by low attenuation air voxels, and surrounded by low attenuation lung parenchyma voxels, only separated by an airway wall which is typically thinner than the image resolution as well as voxel grid spacing, yielding a poor image contrast.

In contrast to airways, pulmonary vessels (i.e., that are blood-filled) have a good contrast to the surrounding lung parenchyma. However, pulmonary vessels cannot be reliably distinguished locally between belonging to the arterial or the venous tree, both of which are intimately intertwined (and the flow direction is not manifesting in CT, which on the other hand is the spatially highest resolving modality).

Furthermore, attempting to follow the course of airways/vessels, and appraising the destination locations as well as the anatomical plausibility of the course is challenging, at least because the depictions of all three tree structures in the image cannot be expected to be complete and connected, due to image resolution, image noise, imaging artifacts (streaks, beam hardening), as well as disease-caused disturbances (mucus, clots, remodeling, tumors, etc.).

The following discloses certain improvements to overcome these problems and others.

SUMMARY

In one aspect, a medical image processing device includes a display device; and an electronic processor programmed to perform a medical image processing method including receiving a three dimensional (3D) medical image; computing least one 3D derivative image of the 3D medical image; identifying a set of fibers in the 3D medical image by tracing fibrous image features in the at least one 3D derivative image starting from respective seed locations in the least one 3D derivative image; and controlling the display device to display an anatomical representation comprising or derived from the set of fibers.

In another aspect, a medical image processing method includes computing a 3D derivative image of a 3D medical image having fibrous image features, the 3D derivative image having local eigenvectors representing directions of the fibrous image features; identifying a set of fibers in the 3D medical image by tracing the fibrous image features in the at least one 3D derivative image starting from respective seed locations in the least one 3D derivative image; and displaying an anatomical representation comprising or derived from the set of fibers.

One advantage resides in improved diagnostic value of medical images that include complex vasculature.

Another advantage resides in improved diagnostic value of pulmonary images that include complex and intertwined vasculature and airways.

Another advantage resides in providing an improved patient-specific image-based representation of the pulmonary ventilation and perfusion systems.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the disclosure.

DETAILED DESCRIPTION

Figure 1:
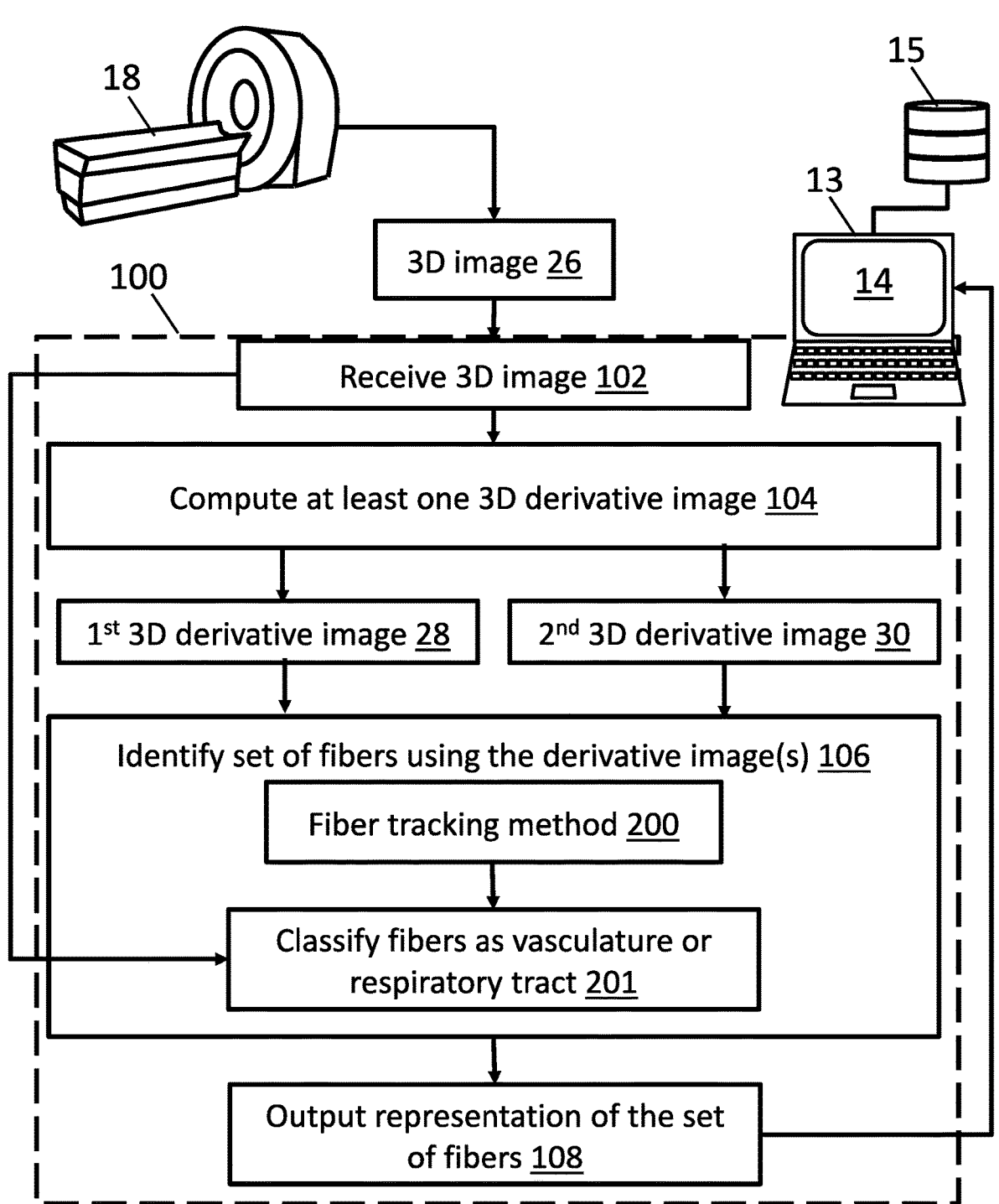
FIG. 1 diagrammatically shows an imaging system in accordance with the present disclosure, with a diagrammatic representation of a flowchart of an imaging method performed using the imaging system.

As used herein, the singular form of "a," "an," and "the" include plural references unless the context clearly dictates otherwise. As used herein, statements that two or more parts or components are "coupled," "connected," or "engaged" shall mean that the parts are joined, operate, or co-act together either directly or indirectly, i.e., through one or more intermediate parts or components, so long as a link occurs. Directional phrases used herein, such as, for example and without limitation, top, bottom, left, right, upper, lower, front, back, and derivatives thereof, relate to the orientation of the elements shown in the drawings and are not limiting upon the scope of the claimed invention unless expressly recited therein. The word "comprising" or "including" does not exclude the presence of elements or steps other than those described herein and/or listed in a claim. In a device comprised of several means, several of these means may be embodied by one and the same item of hardware.

The following discloses improved approaches for extraction of vasculature (including venous/arterial disambiguation) and pulmonary airways from a pulmonary (i.e., lung or lungs) image. In some illustrative embodiments, at least one three-dimensional (3D) derivative image is computed from the pulmonary image, for example by utilizing Hessian matrix approaches, and a set of fibers in the 3D pulmonary image by tracing fibrous image features in the at least one 3D derivative image starting from respective seed locations in the least one 3D derivative image. In some embodiments, a centering approach is employed during the tracking to ensure the fiber center is tracked, thus reducing likelihood of premature termination of the tracking due to moving outside of the diameter of the imaged blood vessel or airway. Advantageously, the initial fiber extraction employs the 3D derivative image and tracks individual fibers from seed points, which beneficially combines local information with larger-scale regional information provided by directionality captured by the 3D derivative image. Furthermore, the single-fiber tracking from seed locations avoids potential ambiguities at obscured regions of the image, as the fiber tracking will stop when the tracking is no longer deemed reliable based on a suitable quantitative criterion. After extraction, the fibers of the set of fibers are classified as belonging to the vasculature or to the respiratory tract, for example based on contrast of the corresponding fibrous image features in the 3D pulmonary image.

The resulting set of classified fibers can be used in various ways. In one use case, the classified fibers are joined based on the expected anatomical connectivity to construct vascular and respiratory tract networks. For example, two or more fibers of the vascular class that meet at a common point can be joined as blood vessels branching at that common point. Likewise, two or more fibers of the respiratory tract class that meet at a common point can be joined as airways branching at that common point. This forms interconnected blood vessels and airway networks. Based on known pulmonary anatomy, these networks can be further placed into a larger anatomical context. For example, the airways are expected to branch from the trachea (if in the field of view of the pulmonary image) to bronchial tubes that enter the lung from the superior orientation and are directed generally in the inferior direction to branch from the lower end of the bronchial tube into successively smaller and smaller branching airways. Likewise, the vascular networks can be mapped to known gross anatomical pulmonary vasculature layout.

In another use case, the set of fibers is used without being joined together. For example, the set of fibers can serve as input to a machine learning (ML) model that is trained for a particular diagnostic or other clinical task. This model input is more information-dense than merely inputting the pulmonary image to the ML model, as the set of fibers contains information derived from the tracking and classification (e.g., each fiber has a defined extent and local direction at each point along the fiber, and is classified as part of either vasculature or respiratory tract). Yet the input is also a substantially smaller dataset than the raw image. As one specific use example, the ML model may be trained to diagnose a problem with the pulmonary vasculature using as input the sub-set of the set of fibers classified as vasculature. This improves ML model accuracy by removing the pulmonary tract data, but also does not rely on excessive (and possibly incorrect) assumptions about the data such as connectivity (which in this use case is not provided as the set of fibers, without derived connections, is the input to the ML model).

FIG. 1 shows a medical imaging device 18 (also referred to as an image acquisition device, imaging device, and so forth). The illustrative medical imaging device 18 comprises a computed tomography (CT) scanner 18. However, more generally the medical imaging device could be a CT imaging device, a magnetic resonance imaging (MRI) device, or other imaging modality capable of capturing a three-dimensional (3D) image 26 with sufficient spatial resolution to image the pulmonary vasculature and airways.

An electronic processing device 13, such as an illustrative computer 13 (which could optionally comprise a cloud computing resource, server computer, or the like), receives the 3D image 26 (e.g., a 3D pulmonary image of one or both lungs, for illustrative examples herein). A non-transitory computer readable medium 15 (e.g., hard drive, solid state drive, or the like) stores instructions executable by the electronic processor 13 to perform a medical image processing method or process 100.

With continuing reference to FIG. 1, an illustrative embodiment of the medical image processing method 100 is diagrammatically shown as a flowchart. At an operation 102, the electronic processor 13 receives the three dimensional (3D) medical image 26 of a portion of the patient P. For example, the 3D medical image 26 is a 3D pulmonary image of at least one lung of the patient P, and can be of any suitable modality (e.g., CT, a grayscale MRI image, and so forth).

At an operation 104, at least one 3D derivative image 28, 30 of the 3D medical image 26 is computed. The at least one 3D derivative image includes a first 3D derivative image 28 having local eigenvectors representing directions of the fibrous image features, and a second 3D derivative image 30 derived from the first 3D derivative image 28 and having local eigenvectors directed toward centerlines of the fibrous image features. In some embodiments, the first 3D derivative image 28 is computed by operations including applying a 3D Hessian matrix to the 3D medical image 26. In other embodiments, the first 3D derivative image 28 is computed by operations including applying a 3D structure tensor matrix to the 3D medical image 26.

In a particular embodiment, the computing of the first and second 3D derivative images 28, 30 includes computing the first 3D derivative image 28 as a 3D second-order derivative image of the 3D medical image 26. The second 3D derivative image 30 is derived from the first 3D derivative image 28 by performing an orthonormalization on the first 3D derivative image 28 to determine orthogonal vectors that are orthogonal to the local eigenvectors of the first 3D derivative image 28. The orthogonal vectors are weighted based on local eigenvalues of the first 3D derivative image 28 corresponding to the local eigenvectors of the first 3D derivative image 28.

At an operation 106, a set of fibers is identified in the 3D medical image 26 by tracing fibrous image features in the first or second 3D derivative image 28, 30 starting from respective seed locations in first or second 3D derivative image 28, 30. To do so, the electronic processor 13 is configured to perform a fiber tracking method 200 to track the fibrous image features along the local eigenvectors of the first 3D derivative image 28 that represent directions of the fibrous image features. The tracking method 200 may include biasing the tracking toward centerlines of the fibrous image features using the local eigenvectors of the second 3D derivative image 30. The fibers of the resulting set of fibers are classified by a classification method 201 to classify each fiber as either vasculature or respiratory tract. The classification 201 suitably classifies the fibers of the set of fibers as belonging to the vasculature or to the respiratory tract based on contrast of the corresponding fibrous image features in the 3D medical image 26. The contrast aspects used for this classification depend on the nature of the imaging performed by the medical imaging device 18. For example, if the imaging is CT imaging using an intravascularly injected vascular contrast agent, then fibers belonging to the vasculature may have higher contrast than fibers belonging to the respiratory tract, due to the presence of contrast agent in the blood flowing through the blood vessels. Other imaging modalities or imaging sequences may produce other types of detectably different vascular and respiratory tract contrast in the 3D image 26.

At an operation 108, the electronic processor 13 controls the display device 14 to display an anatomical representation 32 comprising or derived from the set of fibers. In some examples, the anatomical representation 32 comprises a two-dimensional anatomical sheet containing the set of fibers. In other examples, the anatomical representation 32 comprises a representation of vasculature of the at least one lung and/or a respiratory tract of the at least one lung. In another example, the anatomical representation 32 comprises at least a representation of vasculature of a respiratory tract. In such examples, the electronic processor 13 classifies the fibers of the set of fibers as belonging to the vasculature or to the respiratory tract based on contrast of the corresponding fibrous image features in the 3D medical image 26.

EXAMPLE

Figure 2:
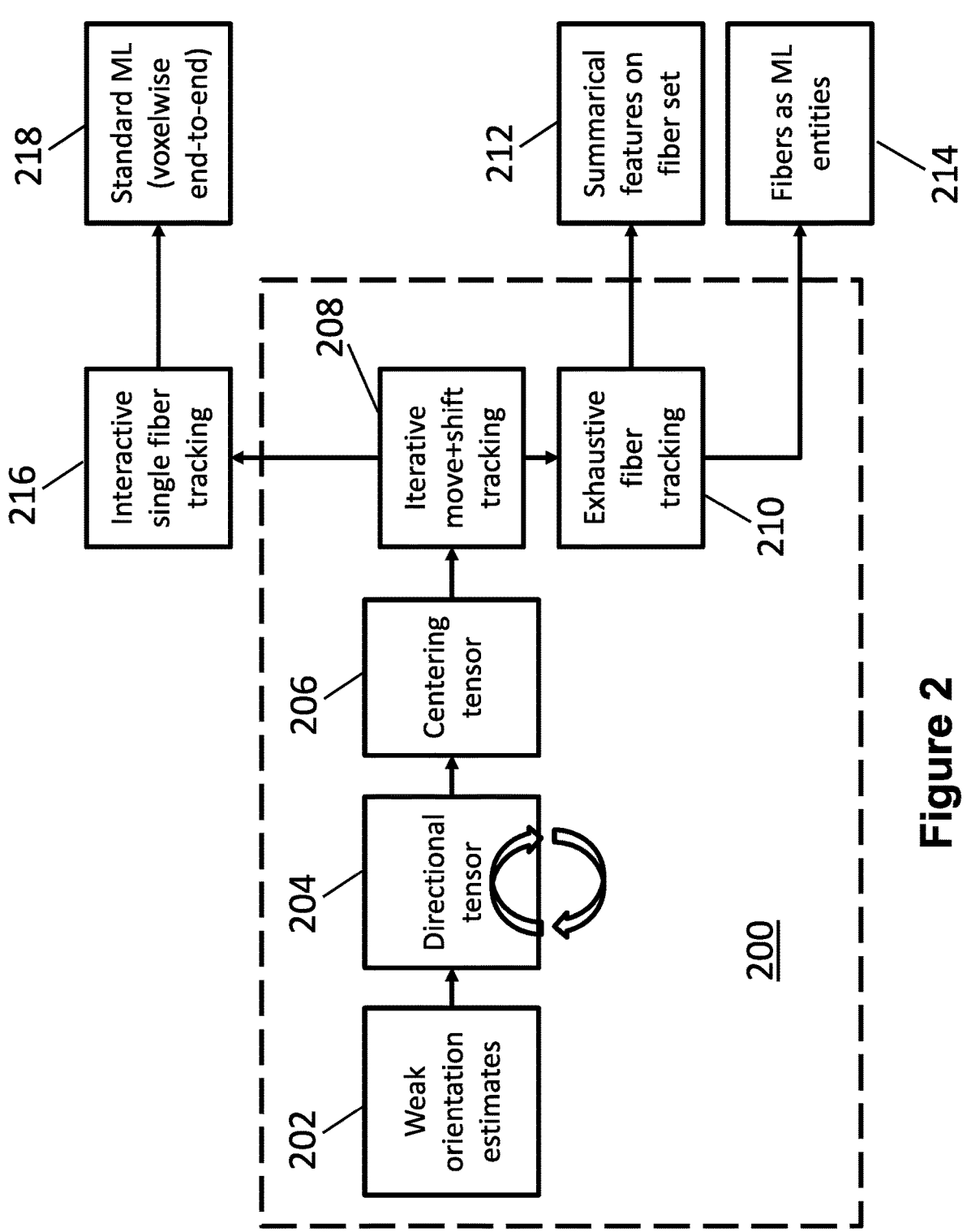
FIG. 2 diagrammatically shows a flowchart of the fiber tracking method employed in the imaging method of FIG. 1, along with some additional illustrative use cases for the extracted set of fibers in which the fibers are classified as vasculature or respiratory tract.

FIG. 2 shows an illustrative embodiment of the fiber tracking method 200. At an operation 202, the electronic processor 13 is configured to process a standard (i.e., scalar) CT image volume (i.e., the 3D medical image 26) to generate weak orientation estimates of the first 3D derivative image 28 and the second 3D derivative image 30. Two vector volumes are then pre-computed-a local weighted directional tensor (at an operation 204) and a local centering shift tensor (at an operation 206). At an operation 208, a fiber tracing mechanism is performed to measure an iterative move and shift tracking of the fibers from seeds under a condition of non-looping back (i.e., increasing a Euclidean distance between the fibers). At an operation 210, an exhaustive fiber tracking is performed in which a summary feature on the fiber set is output (at an operation 212). In one use case, the set of fibers (preferably classified as vasculature or respiratory tract per the classification method 201 of FIG. 1, not shown in FIG. 2) serve as input to one or more machine-learning (ML) entities (at an operation 214). Optionally, the tracked fibers can be further refined. For example, at an operation 216, an interactive single fiber tracking process is performed in which a standard ML process is performed at an operation 218. The fiber course can be shown in 3D and as longitudinal reformats for interactive acceptance and labeling by a user. In addition, automatic labelling can be performed by the electronic processor 13 by relation to a generic thorax model (i.e., trachea, cardiac outlets, and inlets, and so forth). Moreover, the fiber set properties can be correlated to MV monitoring and changes (i.e., PEEP values).

The fiber tracking approach for extracting pulmonary vasculature and the pulmonary airway network provides several advantages. A user can appraise/select/label full-length 3D fibers (i.e., 1-dimensionally parametrized, curving through the 3D-space, etc.), rather than single voxels (0-dimensionally). The fibers can be derived mainly from directional alignment rather than contrast/appearance. The fibers can be identified without dependance on tree connectedness (i.e., resolution, noise, disease, etc.). The method 100 can be applicable to standard conventional CT scan (i.e., scalar, non-vectorial, etc.), and reduce noise resistance. The method 100 is suitable for identifying subtle airway and vein pieces. The method 100 provides an efficient offline pre-computation of vector volumes for subsequent interactive inspection, and provides the same implementation usable for pulmonary airways, arteries, veins, and so forth. In implementation, the method 100 provides practical feasibility shown on real-world CT-data, is numerically stable, and can be implemented efficiently using massive parallelization (GPUs, SIMD-CPUs), and optimized spatial Gaussian filters, the fibers/traces/tracks are suitable for interactive model building, and as base elements for machine learning, and patient-specific descriptive statistics, and the described technique is applicable to other organs and modalities (cardiac coronaries, liver, MR, etc.).

In some embodiments, a lung volume of interest can be extracted out of an overall chest CT image 26 (e.g., as a mask by model-based segmentation, or CNN-model-inference). Left and right lung volumes can be separated, and/or separate volumes of interest can be resampled to an isotropic voxel grid.

In some embodiments, the local Hessian matrix can be used to generate the first 3D derivative image 28 as three gradient volumes ($\partial x$, $\partial y$, $\partial z$) and six independent second derivative volumes ($\partial xx$, $\partial yy$, $\partial zz$, $\partial xy$, $\partial yz$, $\partial zx$). This can be performed for multiple scales ($\sigma$) and a scale yielding maximum response can be selected. The local eigenvalues and eigenvectors can be determined and ordered. The eigenvector h corresponding to the weakest scalar eigenvalue $w^2$ is selected for each voxel $\{x,y,z\}$. A selection of locations with either positive or negative eigenvalue sign can be made (?), depending on tracking airways vs vessels.

For the next step (determination of local vector alignment), a dense matrix-field (tensor) is formed by each local 3×3 matrix (so-called structure tensor, ST) for every 3D voxel position $\{x, y, z\}$.

This local structure tensor can be computed as an outer product of a weakest eigenvector n weighted by the square root of a weakest eigenvalue w can be stored in a 6-valued float type tensor (i.e., the 6 independent components of a symmetric 3×3 structure tensor, outer product of itself: wh*wh, for every voxel position (see, e.g., Haußecker, Horst; Jähne, Bernd. A tensor approach for precise computation of dense displacement vector fields. In: *Mustererkennung 1997: 19. DAGM-Symposium Braunschweig, 15.-17. September 1997.* Springer Berlin Heidelberg, 1997. S. 199-208.)

As part of the alignment operation, in some embodiments, a Gaussian smoothing of the 6 ST-volumes can be performed, followed by the determination and ordering of the local eigenvalues and eigenvectors. Then the eigenvector n corresponding to the strongest eigenvalue $v^2$ is selected, resulting in normalized direction vector n and scalar weight v. These steps can be iteratively performed, by storing again the outer product vn*vn, in a tensor (matrix field) for every voxel position.

For the centering operation, the local alignment weight v can be used to form a centering tensor [vx, vy, vz, v] (4-valued vector field over all voxels $\{x,y,z\}$) A Gaussian smoothing of the tensor (4 float-volumes) can be performed. A shift vector s' can be determined by s'=[<vx>, <vy>, <vz>]/<v>, where the brackets < > denote the neighborhood smoothing result. An ortho-normalization operation can be performed in order to ensure vector orthogonality of the shift vector s to n by computing: s=s'−(s'n) n. In summary, the result are two dense orthogonal and normalized vector fields n(x) and s(x).

For the single fiber tracking operation, a local centering shift vector is applied towards a highest alignment. A sign of local direction can be switched to best align with current, and the local directional step is applied. This is repeated until a Euclidean distance from seeds saturates. In some examples, a curvature radius condition (instead of a monotonous Euclidean distance) can be applied.

In some embodiments, voxel or sub-voxel tracking can be performed. To do so, two 3-component vector volumes (i.e., a 6-tensor-volume) are pre-computed and tracked on an isotropic voxel grid. In other examples, a 6+3 tensor volume can be pre-computed and tracked by solving for eigenvectors on an interpolated sub-voxel positions.

In some embodiments, fibers can be concatenated for orthograde and retrograde directions from the seed. To do so, an exhaustive seed set can be determined automatically. A local density of the fiber set can be determined, and each fiber can be scored underlying fiber density. A statistical analysis can be applied to an overall fiber set, such as abundance, length, curvedness, tortuosity, regional density/divergence/rotation, and so forth. In another example, a local radius can be estimated along each tracked fiber, for example by a maximum Laplacian-sigma of local alignment or by ray-casting to a half maximum value.

The method 100 can be from 1-dimensional fiber to 2-dimensional sheet structures (in particular the lobar and segmental pulmonary fissures) in the following way. A weak estimate of the local normal orientation is derived from the strongest eigenvector of the local Hessian matrix and stored as its outer vector product in structure tensor volume. The local normal orientation is consolidated iteratively by soothing the structure tensor volume, extracting the strongest eigenvector, and re-populating the structure tensor volume. A sheet tracking from any given seed point, by region growing along each voxel's two weak eigenvectors (orthogonal to normal), and a centering towards maximum alignment parallel to the local normal. The region growing is limited by the condition of high local alignment above a certain alignment threshold.

The vector volumes may advantageously be stored in Float Vector4 types which are widely available for GPUs and SIMD-CPUs.

Also, the tensor smoothing can be implemented in these types.

The 6-valued float-type structure tensor can be stored as 6 independent float image volumes, which allows to apply standard 3D Gaussian smoothing to each float type volume for the iterative processing of the locally resolved structure tensor.

The single fiber tracking can be done in subvoxel accuracy. This requires a 9-valued tensor (6 values for the structure tensor and 3 values for the centering tensor), thus the eigenvector problem can be solved from the grid-interpolated 6 values of structure-tensor (e.g., using trilinear or cubic local voxel grid interpolation), and the shift vector be interpolated from the centering tensor. (Note that the 6-valued representation of the local ST has to be preserved in order to account for the ambiguity of the vector orientation (ortho/retrograde) and the non-linearity of the third-degree eigenvalue polynomial.)

The single fiber tracking can be in voxel accuracy using nearest neighbor sampling (given that the VOI was resampled to an appropriate isotropic resolution before). This requires a 6-valued-tensor (3 values for a direction vector, local alignment score may be carried as the length of the non-normalized direction vector, and 3 values for a shift vector, unnormalized). The voxel-grid based tracking (nearest neighbor on isotropic grid) requires less memory and does not require an eigenvector solution, thus allowing, e.g., to track 106 fibers in both directions up to a maximum of 500 discrete steps in less than 5 seconds.

The disclosure has been described with reference to the preferred embodiments. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:

1. A medical image processing device, comprising:
a display device; and
an electronic processor programmed to perform a medical image processing method including:
receiving a three dimensional (3D) medical image;
computing at least one 3D derivative image of the 3D medical image;
identifying a set of fibers in the 3D medical image by tracing fibrous image features in the at least one 3D derivative image starting from respective seed locations in the at least one 3D derivative image; and
controlling the display device to display an anatomical representation comprising or derived from the set of fibers;
wherein the computing of the at least one 3D derivative image includes:
computing a first 3D derivative image as a 3D second-order derivative image of the 3D medical image; and
deriving a second 3D derivative image from the first 3D derivative image by performing an orthonormalization on the first 3D derivative image to determine orthogonal vectors that are orthogonal to local eigenvectors of the first 3D derivative image and weighting the orthogonal vectors based on local eigenvalues of the first 3D derivative image corresponding to the local eigenvectors of the first 3D derivative image.

2. The medical image processing device of claim 1, wherein the 3D medical image is a 3D pulmonary image of at least one lung, and the anatomical representation comprises a representation of vasculature of the at least one lung and/or a respiratory tract of the at least one lung.

3. The medical image processing device of claim 2, wherein the anatomical representation comprises at least a representation of vasculature of a respiratory tract, and the medical image processing method further includes: classifying fibers of the set of fibers as belonging to the vasculature or to the respiratory tract based on contrast of the corresponding fibrous image features in the 3D pulmonary image.

4. The medical image processing device of claim 1, wherein the anatomical representation comprises a two-dimensional anatomical sheet containing the set of fibers.

5. The medical image processing device of claim 1, wherein the 3D medical image is a computed tomography (CT) image.

6. The medical image processing device of claim 1, wherein the 3D medical image is a grayscale magnetic resonance imaging (MRI) image.

7. A medical image processing device, comprising:

a display device; and an electronic processor programmed to perform a medical image processing method including:

receiving a three dimensional (3D) medical image;

computing at least one 3D derivative image of the 3D medical image;

identifying a set of fibers in the 3D medical image by tracing fibrous image features in the at least one 3D derivative image starting from respective seed locations in the at least one 3D derivative image; and controlling the display device to display an anatomical representation comprising or derived from the set of fibers;

wherein the at least one 3D derivative image includes:

a first 3D derivative image having local eigenvectors representing directions of the fibrous image features; and a second 3D derivative image derived from the first 3D derivative image and having local eigenvectors directed toward centerlines of the fibrous image features; and wherein the tracing of fibrous image features in the at least one 3D derivative image includes:

tracking the fibrous image features along the local eigenvectors of the first 3D derivative image that represent directions of the fibrous image features; and biasing the tracking toward centerlines of the fibrous image features using the local eigenvectors of the second 3D derivative image.

8. The medical image processing device of claim 7, wherein the 3D medical image is a 3D pulmonary image of at least one lung, and the anatomical representation comprises a representation of vasculature of the at least one lung and/or a respiratory tract of the at least one lung.

9. The medical image processing device of claim 8, wherein the anatomical representation comprises at least a representation of vasculature of a respiratory tract, and the medical image processing method further includes: classifying fibers of the set of fibers as belonging to the vasculature or to the respiratory tract based on contrast of the corresponding fibrous image features in the 3D pulmonary image.

10. The medical image processing device of claim 7, wherein the anatomical representation comprises a two-dimensional anatomical sheet containing the set of fibers.

11. The medical image processing device of claim 7, wherein the 3D medical image is a computed tomography (CT) image.

12. The medical image processing device of claim 7, wherein the 3D medical image is a grayscale magnetic resonance imaging (MRI) image.

13. A medical image processing device, comprising:

a display device; and an electronic processor programmed to perform a medical image processing method including:

receiving a three dimensional (3D) medical image;

computing at least one 3D derivative image of the 3D medical image;

identifying a set of fibers in the 3D medical image by tracing fibrous image features in the at least one 3D derivative image starting from respective seed locations in the at least one 3D derivative image; and controlling the display device to display an anatomical representation comprising or derived from the set of fibers;

wherein the at least one 3D derivative image includes:

a first 3D derivative image having local eigenvectors representing directions of the fibrous image features; and a second 3D derivative image derived from the first 3D derivative image and having local eigenvectors directed toward centerlines of the fibrous image features; and wherein the first 3D derivative image is computed by operations including applying a 3D Hessian matrix to the 3D medical image.

14. A medical image processing device, comprising:

a display device; and an electronic processor programmed to perform a medical image processing method including:

receiving a three dimensional (3D) medical image;

computing at least one 3D derivative image of the 3D medical image;

identifying a set of fibers in the 3D medical image by tracing fibrous image features in the at least one 3D derivative image starting from respective seed locations in the at least one 3D derivative image; and controlling the display device to display an anatomical representation comprising or derived from the set of fibers;

wherein the at least one 3D derivative image includes:

a first 3D derivative image having local eigenvectors representing directions of the fibrous image features; and a second 3D derivative image derived from the first 3D derivative image and having local eigenvectors directed toward centerlines of the fibrous image features; and wherein the first 3D derivative image is computed by operations including applying a 3D structure tensor matrix to the 3D medical image.

15. A medical image processing method, comprising:

computing a first three-dimensional (3D) derivative image of a 3D medical image having fibrous image features, the first 3D derivative image having local eigenvectors representing directions of the fibrous image features;

deriving a second 3D derivative image from the first 3D derivative image, the second 3D derivative image having local eigenvectors directed toward centerlines of the fibrous image features;

identifying a set of fibers in the 3D medical image by tracing the fibrous image features in the first 3D derivative image starting from respective seed locations in the first 3D derivative image, wherein the tracing of fibrous image features in the first 3D derivative image includes:

tracking the fibrous image features along the local eigenvectors of the first 3D derivative image that represent directions of the fibrous image features; and biasing the tracking toward centerlines of the fibrous image features using the local eigenvectors of the second 3D derivative image; and displaying an anatomical representation comprising or derived from the set of fibers.

16. The medical image processing method of claim 15, wherein the 3D medical image is a 3D pulmonary image of at least one lung, and the anatomical representation comprises a representation of vasculature of the at least one lung and a respiratory tract of the at least one lung.

\* \* \* \* \*